Patented Nov. 6, 1945

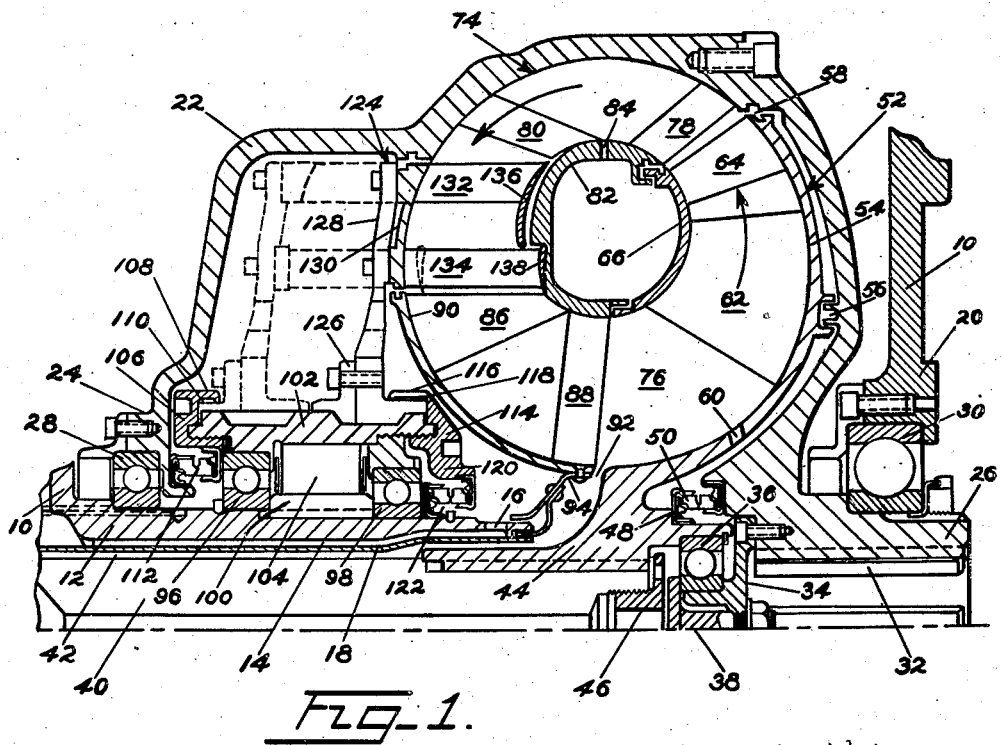

2,388,329

UNITED STATES PATENT OFFICE 2,388,329

FLUID TORQUE CONVERTER

Joseph Jandasek, Detroit, Mich., assignor to Bendix Aviation Corporation, Detroit, Mich., a corporation of Delaware Application June 30, 1943, Serial No. 492,967

5 Claims. (Cl. 60—54)

This invention relates to transmissions, and more particularly to that type known as fluid torque converters.

An object of the invention is to provide a fluid torque converter having the most efficient fluid flow stream.

Another object of the invention is to provide a fluid torque converter having a conventional vortex chamber, vanes for energizing fluid, and vanes for absorbing energy from the fluid so arranged in the chamber and in relation to one another that the most efficient flow stream may be attained.

Another object of the invention is to provide a fluid torque converter including an impeller, a turbine, and a reaction member each having at least two sets of vanes.

Another object of the invention is to provide a torque converter including an impeller, a turbine driven thereby, and a reaction member cooperating with the impeller and turbine each having two sets of vanes, one set characterized in that they have a high lift and are overbent, and the other set characterized in that they have a relatively low lift, and are so arranged as to equalize the flow stream.

Other objects and advantages of the invention will appear from the following description taken in connection with the drawing forming a part of this specification, and in which, Fig. 1 is a longitudinal sectional view of a fluid torque converter, partly broken away;

Fig. 2 is a diagrammatical view illustrating the vane structure; and

Fig. 3 is a diagrammatical view illustrating a modification of the vane structure.

Referring to the drawing for more specific details of the invention, 10 represents a stationary frame having rigidly secured thereto a sleeve 12 internally slotted to provide a channel 14 terminating in an opening 16 through the wall of the sleeve, and the channel 14 is covered as by a tube 18 fitted snugly in the sleeve. The frame 10 also has a bearing support 20 concentrically disposed with relation to the sleeve 12.

A housing 22 has oppositely disposed axial hubs 24 and 26. The hub 24 receives a bearing 28 fitted on the stationary sleeve 12, and the hub 26 receives a bearing 30 fitted on the support 20. The hub 26 has internal splines 32 for the reception of a driven shaft, not shown, and bolted or otherwise secured on the hub is a bearing support 34 for the reception of a bearing 36 held in place by a retainer 38.

A driving shaft 40 is fitted in the tube 18 with ample clearance to provide an annular passage 42. The shaft has thereon a hub 44 held against displacement by a retaining nut 46 threaded in the end of the shaft, and the hub 44 has a concentrically disposed sleeve 48 for the reception of the bearing 36, and a fluid seal 50 is interposed between the hub 44 and the hub 26 of the housing 22.

An impeller indicated generally at 52 includes an outer shroud 54 integral with the hub 44. The shroud is spaced from the wall of the housing 22, and labyrinth seals 56 and 58 have parts on the shroud cooperating with complementary parts on the housing to retard the flow of fluid between the shroud and the housing, and the shroud has an opening 60 therethrough for the passage of fluid so that pressure on the inner and outer faces of the shroud may be balanced.

The outer shroud 54 has arranged thereon two sets of vanes 62 and 64, one set spaced from the other set by a free equalizing vortex, and an inner shroud section 66 is supported by the vanes. The vanes 62 are characterized in that they are of a streamline type having a high lift 68 and an overbend portion 70; in other words, they are so contoured as to effectively absorb energy from the fluid, and the blades 64 are characterized in that they are of the streamline type having relatively low lift 72, and are effective for equalizing the flow stream and also for absorbing energy from the fluid.

A turbine indicated generally at 74 cooperates with the impeller to provide a vortex chamber 76 for the circulation of fluid. The turbine is of the two-stage type. The first stage includes two sets of vanes 78 and 80 secured to the rotatable housing 22, and the sets are spaced apart by a free equalizing vortex. The vanes 78 and 80 correspond respectively to the vanes 62 and 64 of the impeller, and the vanes support an inner shroud section 82 cooperating with the inner shroud section 66 to provide a core which may be vented as indicated at 84.

The second stage of the turbine includes two sets of vanes 86 and 88 alike in structure and arrangement to the vanes 78 and 80 of the first stage, and the vanes 86 and 88 support an outer shroud 90 having one of its ends spaced from the hub 44 to provide a fluid inlet 92 to the vortex chamber, and the shroud 90 has secured thereto a ring 94 having wiping engagement with the stationary sleeve 12 and serving to complete the channel 42.

Fluid is supplied to the vortex chamber 76 from a suitable source of supply, not shown, by way of the annular passage 42 and inlet 92, and returned to the source of supply by way of the clearances between the shrouds of the turbine and reaction member to the housing, and thence through the opening 16 and passage 14 to the source of supply.

The stationary sleeve 12 has thereon bearings 96 and 98 spaced apart by a ring 100 keyed or otherwise secured to the sleeve. The bearings support for rotation a threaded sleeve 102, and a one-way drive 104 is interposed between the ring 100 and the threaded sleeve. A ring 106 threaded in one end of the sleeve 102 has a concentric flange 108 extended over the sleeve to provide in conjunction therewith an annular chamber 110, the purpose of which will hereinafter appear. The ring 106 supports a fluid seal 112 interposed between the bearing 96 and the housing 22 for inhibiting seepage of fluid from the housing.

Correspondingly, a ring 114 threaded in the other end of the sleeve 102 has a concentric flange 116 extended over the sleeve to provide an annular chamber 118, the purpose of which will hereinafter appear, and also a flange 120 for the reception of a fluid for the reception of a fluid seal 122 serving to secure the bearing 98 against displacement and also for inhibiting seepage of fluid from the housing through the bearing. The fluid seals 112 and 122 impose slight frictional resistance to rotation of the threaded sleeve 102.

A retractile reaction member for cooperation with the impeller and turbine is indicated generally at 124. The reaction member includes a carrier 126 mounted for travel on the threaded sleeve 102 between the rings 106 and 114. The carrier has its respective ends so shaped as to enter the annular chambers 110 and 118 upon completion of its travel in both directions of movement so as to effectively cushion the same.

The carrier supports a spider 128 having secured thereto an outer shroud section 130, and arranged on the shroud are spaced sets of vanes 132 and 134. The vanes 132 support an inner shroud section 136 extended beyond the trailing edges of the vanes 132 to the leading edges of the vanes 134. These vanes are somewhat wider than the vanes 132 and they support an inner shroud section 138. The vanes 132 are characterized in that they are streamline vanes having high lift and are substantially overbent so as to quickly influence the turning moment of the fluid, and the vanes 134 are streamline vanes having relatively low lift and are effective for equalizing the flow stream. The vanes 132 and 134 do not differ materially in structure and arrangement from the vanes of the turbine.

A modification of the vane structure is illustrated in Fig. 3. In this embodiment a set of streamline vanes 200 includes spaced vanes 202 each characterized in that it has a substantial lift 204 and an overbend 206 for effectively absorbing energy from the fluid, and arranged in spaced relation between the vanes 202 at the entrance of the channels therebetween are streamline rectifying vanes 208 and 210 for effectively directing the flow stream through the channels. Preferably the rectifying vanes 210 are somewhat longer than the rectifying vanes 208 so as to more effectively direct the flow stream. Because of the overbend characteristics of the vanes 202, the flow stream is distorted to an undesirable extent, and to overcome this objection a second set of streamline equalizing vanes 212 is arranged in spaced relation to the trailing edges of the vanes 202. This second set of vanes includes spaced streamline vanes 214 of relatively low lift 216 for directing the flow and effectively equalizing the flow stream.

In a normal operation, rotation of the impeller 52 by force transmitted through the driving shaft 40 results in energization of the fluid in the vortex chamber 76. Because of the overbend character of the vanes 62 and the equalizing character of the vanes 64 of the impeller, the maximum energy is imparted to the fluid and the flow stream through the impeller is directed in the most effective path. As the fluid enters the turbine, the energy of the fluid is absorbed by the vanes on the respective stages of the turbine 74 and on the reaction member 124. This results in rotation of the turbine and the consequent transmission of force through the hub 26 thereof to a driven shaft, not shown. During this stage of the operation, the vanes 132 and 134 of the reaction member 124 are held against movement in the flow stream by the one-way drive 104 and consequently torque multiplication is attained.

Because of the particular character and arrangement of the vanes 78 and 80 on the first stage of the turbine, the maximum energy is absorbed from the fluid and the flow stream is equalized as the fluid enters the reaction member where, due to the character and arrangement of the vanes 132 and 134, the maximum energy is again absorbed by these vanes and the flow stream equalized and directed in the most efficient path as the fluid enters the second stage of the turbine, where yet again the vanes 86 and 88 receive the energy of the fluid and equalize the flow stream and effectively direct the fluid to the impeller.

Upon attaining a predetermined speed of the impeller and associated turbine, the flow stream in the vortex chamber 76 changes and the fluid impinges on the backs of the reaction vanes 132 and 134. This results in automatic movement of the reaction member 124 on the threaded sleeve 102, movement of which is frictionally resisted by the fluid seals 112 and 122, and as the reaction member travels on the threaded sleeve, the reaction vanes 132 are fully retracted from the flow stream and the reaction vanes 134 are partly retracted from the flow stream. Toward the end of this movement of the reaction member the carrier 126 enters the annular chamber 110, and this serves to cushion the reaction member, and upon completion of this operation the unit functions as a fluid coupling.

Upon demand for increased torque, the direction of the fluid stream in the vortex chamber again changes so that the fluid initially impinges on the faces of those portions of the vanes 134 remaining in the flow stream, and thereafter on the faces of both the vanes 132 and 134, and this results in travel of the reaction member on the threaded sleeve, the sleeve being held against movement by the one-way drive 104.

During this travel of the reaction member, the reaction vanes 132 and 134 are again introduced into the flow stream. Toward the end of this movement, the carrier 126 is received by the annular chamber 118 so as to cushion the member, and at the end of the movement the reaction member is held against movement in one direction by the one-way drive. This completes the cycle.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A fluid torque converter comprising driving and driven elements each having two sets of fixed streamline vanes arranged in series, the vanes of the forward set having high lift and pronounced overbend, and the vanes of the second set having relatively low lift.

2. A fluid torque converter comprising driving and driven elements each having two sets of fixed streamline vanes, a free equalizing vortex between the sets, the vanes of the leading set having high lift and pronounced overbend, and the vanes of the trailing set having relatively low lift.

3. A fluid torque converter comprising an impeller having two sets of fixed streamline vanes arranged in series, the leading set having high lift and pronounced overbend, a turbine for cooperation with the impeller having two stages each including two sets of fixed streamline vanes arranged in series, the leading set having high lift and pronounced overbend, and a reaction member for cooperation with the impeller and turbine having two sets of fixed streamline vanes, the leading set having high lift and pronounced overbend.

4. A fluid torque converter comprising an impeller having two sets of fixed streamline vanes arranged in series with a free equalizing vortex intermediate the sets, the vanes of the leading set having high lift and pronounced overbend, a turbine for cooperation with the impeller, and a reaction member for cooperation with the impeller and turbine.

5. A fluid torque converter comprising an impeller, a turbine associated therewith and a reaction member for cooperation with the impeller and turbine each having two sets of fixed vanes arranged in series with a free equalizing vortex between the sets, the vanes of the leading sets having high lift and pronounced overbend and the trailing set having relatively low lift.

JOSEPH JANDASEK.